United States Patent [19]

Tatsuguchi

[11] 4,388,713

[45] Jun. 14, 1983

[54] ROTATION CONTROL SYSTEM IN A ROTARY RECORDING MEDIUM REPRODUCING APPARATUS

[75] Inventor: Kazuo Tatsuguchi, Yokohama, Japan

[73] Assignee: Victor Company of Japan, Ltd., Yokohama, Japan

[21] Appl. No.: 219,507

[22] Filed: Dec. 23, 1980

[30] Foreign Application Priority Data

Dec. 27, 1979 [JP] Japan .................................. 54-173082
Dec. 27, 1979 [JP] Japan .................................. 54-173083

[51] Int. Cl.$^3$ ........................ G11B 17/00; G11B 19/24
[52] U.S. Cl. ..................................... 369/50; 369/111; 369/189; 369/240; 358/342; 358/338; 360/73
[58] Field of Search ................. 358/128.5, 128.6, 342, 358/338, 322, 321; 360/73; 369/43, 44, 111, 239, 240, 241, 266, 50, 267, 189; 318/314, 318

[56] References Cited

U.S. PATENT DOCUMENTS

4,190,860  2/1980  Somers ........................... 358/128.5
4,223,349  9/1980  Dakin ............................. 358/128.5

Primary Examiner—Alan Faber
Attorney, Agent, or Firm—Louis Bernat

[57] ABSTRACT

A rotation control system is used in an apparatus for reproducing information signals from a rotary recording medium by use of a reproducing stylus, wherein the rotary recording medium having the information signals recorded thereon so that the relative velocity between a recording element and the rotary recording medium is maintained constant. The rotation control system comprises a motor for rotating the rotary recording medium, variable resistor for obtaining a voltage corresponding to the position of the reproducing stylus on the rotary recording medium, variable frequency oscillator supplied with the above voltage, for producing a signal having a frequency respective of the voltage supplied thereto, rotation detector for detecting the rotation of the above motor, comparator for comparing the output signal of the variable frequency oscillator with the output signal of the rotation detector, to produce an output difference signal, and a circuit for controlling the rotation of the motor in response to the difference signal.

4 Claims, 8 Drawing Figures

ROTATION CONTROL SYSTEM IN A ROTARY RECORDING MEDIUM REPRODUCING APPARATUS

BACKGROUND OF THE INVENTION

The present invention generally relates to rotation control system in rotary recording medium reproducing apparatuses, and more particularly to a rotation control system which controls the rotation of the recording medium, so that the relative linear velocity between the rotary recording medium and a reproducing element for reproducing information from the rotary recording medium, is maintained constant regardless of the position of the reproducing element on the rotary recording medium.

Generally, recording is performed by rotating the rotary recording medium at a uniform rotational velocity, and upon reproduction, the rotary recording medium is rotated at a uniform rotational velocity. The above reproducing system is called the uniform angular velocity system (often abbreviated as the CAV system), since the rotary recording medium is rotated at an uniform angular velocity.

In the above CAV system, the relative linear velocity between the rotary recording medium and the reproducing element is reduced, when the position of the reproducing element on the rotary recording medium moves from the outer periphery of the rotary recording medium towards the inner periphery of the rotary recording medium. Accordingly, the worst S/N ratio is obtained at the innermost periphery of the rotary recording medium, since the relative linear velocity becomes the lowest at the innermost periphery of the rotary recording medium. When the number of rotation of the rotary recording medium is established so that an S/N ratio that can be put to practical use is obtained even at the innermost periphery of the rotary recording medium, the relative linear velocity at the outer periphery of the rotary recording medium becomes unnecessarily high, and hence, high recording density cannot be obtained. Furthermore, when only the outer peripheral parts of the rotary recording medium is used to avoid the use of the inner peripheral parts of the rotary recording medium wherein the S/N ratio is inferior, the recording capacity cannot be made large. For the above described reasons, difficulty is introduced especially when the diameter of the rotary recording medium which is to be used, is small.

In order to overcome the above described problems, a uniform linear velocity system (often abbreviated as the CLV system) has been proposed which rotated the rotary recording medium, so that the relative linear velocity between the rotary recording medium and the reproducing element is maintained constant regardless of the position of the reproducing element in the radial direction on the rotary recording medium. According to the CLV system, the above described problems are solved, since the relative linear velocity is always held constant even at the inner peripheral parts of the rotary recording medium.

The applicant has proposed a novel "Information signal recording and reproducing system" as disclosed in the specification of U.S. patent application Ser. No. 785,095, filed Apr. 6, 1977 (now U.S. Pat. No. 4,331,971), and in the specification of U.S. patent application Ser. No. 33,324, filed Apr. 25, 1979 (now U.S. Pat. No. 4,315,283), which is a Continuation-In-Part Application of the parent application Ser. No. 785,095. According to this system, the recording system forms pits in accordance with the information signal being recorded along a spiral track on a flat disc shaped recording medium, without forming a groove therein. In the reproducing system, a reproducing stylus traces over and along this track thereby to reproduce the recorded information signal in response to variations in the electrostatic capacitance.

By the use of this previous proposed system, the recording track has no groove. There is no possibility whatsoever of the reproducing stylus or the recording medium being damaged. The stylus can repeatedly trace the same portion of the track many times, where, by a so-called random access motion, a reproducing stylus is moved at high speed to a desired position on a disc to reproduce a desired information, in addition to a special reproduction such as still, slow motion, or quick motion reproduction.

In this system, however, since a groove for guiding the reproducing stylus is not provided on the disc, pilot or reference signals should be recorded on or in the vicinity of a track of the information signal, such as a video signal, on a rotary disc. At the time of reproducing, the reference signals are reproduced together with the video signal. Hence, the required tracking servo control is carried out so that the reproducing stylus accurately traces along the track in response to the reproduced reference signals. In this system, the reference signal for tracking control must be used.

Therefore, upon starting of a normal reproduction, the reference signal is reproduced as a signal having a frequency different from that of the actual frequency when the relative linear velocity between the rotary recording medium and the reproducing element is not equal to a predetermined value, and thus, normal tracking servo control is not performed. Accordingly, upon normal reproduction, the above relative linear velocity must be maintained at a predetermined velocity regardless of the position of the reproducing element, so that the reference signal is reproduced as a signal having the correct frequency.

SUMMARY OF THE INVENTION

Accordingly, a general object of the present invention is to provide a novel and useful rotation control system in a rotary recording medium reproducing apparatus, in which the above described problems have been overcome.

Another and more specific object of the present invention is to provide a rotation control system in a rotary recording medium reproducing apparatus, which controls the rotation of the rotary recording medium so that the relative linear velocity between the rotary recording medium and the reproducing element is maintained constant according to the position of the reproducing element, before normal reproduction is started and the period signal is normally reproduced.

Still another object of the present invention is to provide a rotation control system for especially controlling the rotation of a rotary recording medium having tracking reference signals recorded thereon, by use of a compared difference signal obtained by comparing a signal which is respective of the position of the reproducing stylus and a signal obtained through detection of the rotation of the driving motor used for rotating the rotary recording medium, before the starting of the normal reproduction.

Other objects and further features of the present invention will be apparent from the following detailed description when read in conjunction with the accompanying drawings.

DETAILED DESCRIPTION

Figure 1:
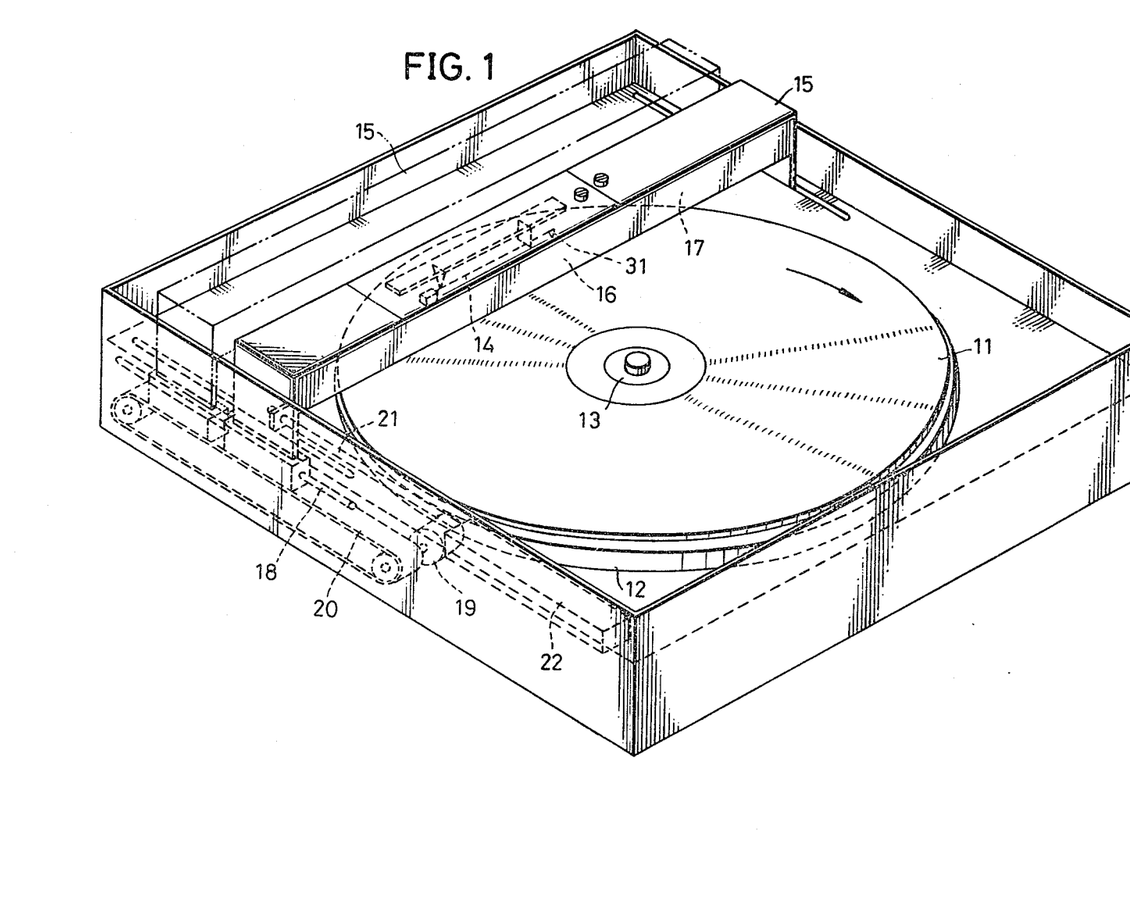
FIG. 1 is a perspective view of a rotary recording medium reproducing apparatus to which a rotation control system of the present invention can be applied.

The general features of an example of the exterior of a reproducing apparatus for reproducing a rotary recording medium, which is applied with a rotational control system according to the present invention, is illustrated in FIG. 1. In this apparatus, a rotary disc 11 is a rotary recording medium having a video signal recorded thereon. The disc 11 is set on and clamped to a turntable 12 by a clamper 13. The record disc is thus rotated unitarily with the turntable 12. The recording on the disc 11 is performed by the CLV system, so that the relative linear velocity between the recording disc and the recording beam is maintained constant throughout the region between the outer and inner periphery of the disc.

A signal pickup device 14 used as a reproducing transducer, is mounted at a re-entrant cylindrical cavity resonator 16 within a carriage 15. The pickup is connected to a central conductor (not shown) of the resonator. The central conductor is electro-magnetically connected to a high frequency oscillator 17 for producing a frequency of 1 GHz, for example. This organization is well known. The carriage 15 is disposed horizontally above the turntable 12, and is guided at its ends by a pair of parallel horizontal guide bars 18 (only one shown). This carriage 15, driven by an endless belt 20 driven by a motor 19, moves continuously in horizontal translation at a speed equal to the distance of one track pitch per revolution of the turntable 12, during a normal reproducing mode. Otherwise, the carriage may be driven by a feed screw driven by the motor 19. The carriage movement is in synchronism with the rotation of the turntable. As a result of this movement of the carrier 15, a reproducing stylus 31 of the signal pickup device 14 travels radially across the disc 11 and traces the spiral track of the disc 11 during rotation.

One end of a beam 21 is fixed onto the carriage 15, and the other end of the beam 21 is fixed to the slider of a variable resistor 22 of the sliding resistor type. Accompanied by the displacement of the carriage 15, the beam 21 is displaced in the same direction as the carriage, and the resistance of the variable resistor 22 is accordingly varied. Hence, a voltage respective of the position of the reproducing stylus 31 of the signal pickup device on the disc 11, in the radial direction of the disc, is obtained from the variable resistor 22. Moreover, a type of a variable resistor which varies its resistance by having the rotation of a motor 19 transmitted thereto to rotate the slider of the variable resistor, can be used as the above variable resistor 22.

A video signal is recorded with spiral track of pits formed on the disc 11 responsive to the information content of the signal. One part of this track is shown in an enlarged scale in FIG. 2. Track turns of the single continuous spiral track, corresponding to each revolution of the disc 11, are designated as $t_1, t_2, t_3 \ldots$. Each track turn is constituted by the formation of pits 26 of the main information signal along the plane track path and has no stylus guide groove formed. With respect to one track turn $t_1$, pits 27 of the first pilot signal fp1 are formed on one lateral side of the track as viewed in the track path direction. Pits 28 of the second pilot signal fp2 are formed on the other side of the track.

Figure 2:
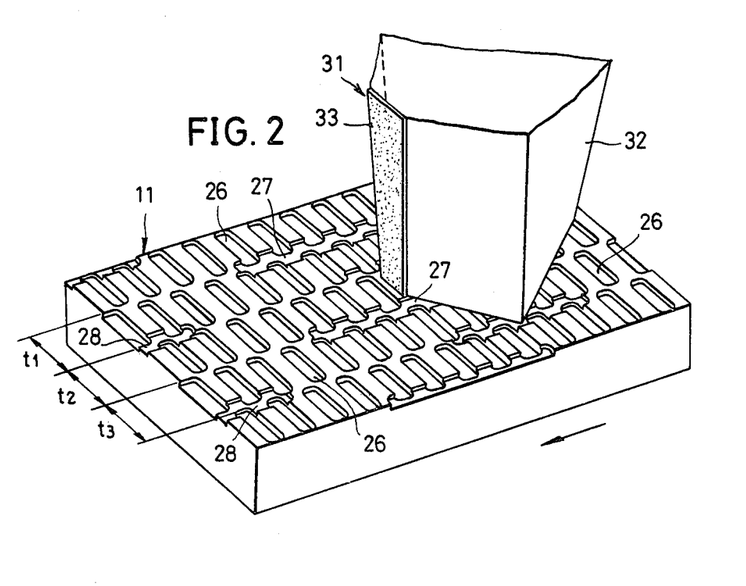
FIG. 2 is an enlarged perspective view showing a part of a rotary recording medium together with a tip part of a reproducing stylus.

In the middle position between the centerlines of adjacent track turns, only pits of either one kind of the pits 27 and 28 of the above mentioned reference signals fp1 and fp2 are formed, and with respect to one track, moreover, the sides on which the pits 27 and 28 are formed are alternated for every track turn. That is, if pits 27 and 28 are respectively formed on the right and left sides, for example, of one track turn, pits 28 and 27 will be respectively formed on the right and left sides of each of the adjacent track turns. The third pilot signal fp3 is recorded at a predetermined position on each track turn. Pits of the third pilot signal fp3 are not shown in the drawings. The third pilot signal fp3, is used for switching the reproduced first and second pilot signals fp1 and fp2 as described hereinafter. Those pilot signals are disclosed in more detail in the above described prior applications.

The reproducing stylus 31 has a tip thereof having a configuration as indicated in FIG. 2. The reproducing stylus 31 is constituted by a stylus structure 32 and having a disc tracing surface which has a width greater than a track width, and an electrode 33 fixed to the rear face of the stylus structure 39. As the reproducing stylus 31 traces along a track on the disc 11 rotating in the direction indicated by arrow, the video signal recorded thereon by variation of pits is reproduced responsive to variations in the electrostatic capacitance between the surface of the disc 11 and the electrode 33 of the reproducing stylus 31.

Figure 3:
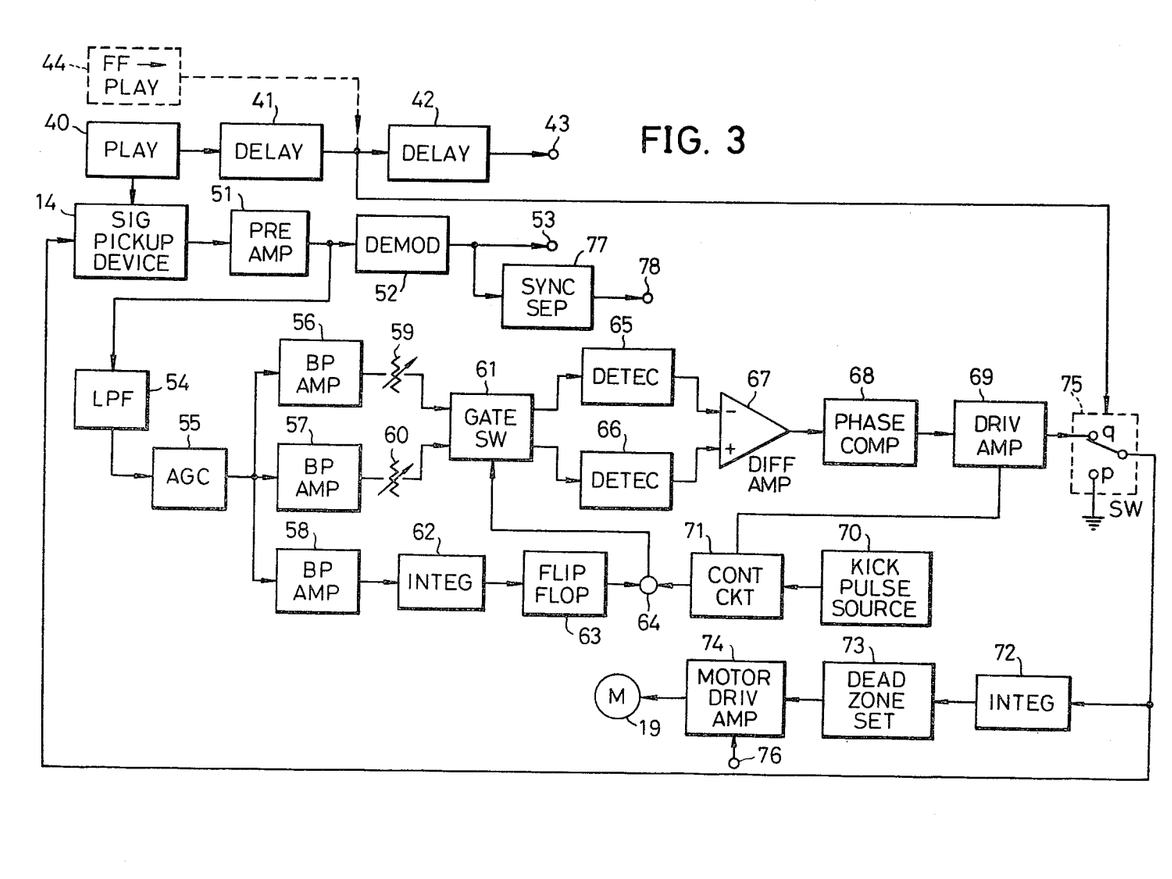
FIG. 3 is a systematic block diagram showing a rotary recording medium reproducing apparatus applied with a rotation control system of the present invention.

In the system shown in FIG. 3 upon normal reproduction, a reproduced signal picked up from the disc 11 as minute variations of electrostatic capacitance by the reproducing stylus 31 of the signal pickup device 14 is supplied to a preamplifier 51 having a resonant circuit. The resonant frequency varies in response to this variation in electrostatic capacitance and is formed into a signal of a desired level. The resulting output of the preamplifier 51, is demodulated into the original information signal by a demodulator 52 and is sent out as an output through an output terminal 53.

The output signal of the preamplifier 51 is supplied to a lowpass filter 54 wherein the reference signals fp1, fp2, and fp3 are separated. The output reference signals pass through an automatic gain control circuit 55 and are supplied respectively to amplifiers 56, 57, and 58. Here, each of the amplifiers 56, 57, and 58 is a kind of band-pass amplifier. The amplifiers 56, 57, and 58 are respectively designed to have steep passing frequency characteristics at only the frequencies fp1, fp2, and fp3. As a result, the signals of frequencies fp1 and fp2 are obtained separately from the amplifiers 56 and 57, respectively. These signals respectively pass through level adjustors 59 and 60, where their levels are adjusted. The resulting signals are then supplied to a gate switching circuit 61.

The signal fp3 separated and amplified in this bandpass amplifier 58 is supplied to an integration circuit 62. There, its wave is shaped so that it is not affected by noise and other influences. The wave-shaped signal is then applied to trigger a flip-flop 63. The resulting output of this flip-flop 63 is sent out through a terminal 64 and applied to the gate switching circuit 61 as a switching pulse.

A switching pulse from the flip-flop 63 is supplied through the terminal 64 to the gate switching circuit 61. The gate switching circuit 61 switches the signals fp1 and fp2 every revolution period of the disc 11. The switching pulse applied to the terminal 64 has inverting polarities which change every rotation of the disc 11. As a result, the gate switching circuit 61 supplies the signals fp1 and fp2 of respectively predetermined polarities to detecting circuits 65 and 66.

The detecting circuits 65 and 66 detect the envelopes of their respective input reference signals and convert the envelopes into DC voltages. These voltages are then supplied to a differential amplifier 67. This differential amplifier 67 compares the output signals of the two detecting circuits 65 and 66 which vary in response to the reproduced levels of the signals fp1 and fp2. This generates an output tracking error signal which indicates the tracking error direction and the error quantity. This error signal passes through a phase compensation circuit 68 and is further amplified to a specific level by a driving amplifier 69. Then, it is applied to the tracking coil of the signal pickup device 14 as a control signal to control it, through an electronic switch 75 connected at the side of a contact point q. As a result, the reproducing stylus 31 is tracking-controlled so that the above mentioned tracking error signal becomes zero, that is, so that the stylus 31 correctly traces the track of the disc 11.

At the time of a special reproducing mode of operation such as still reproduction, slow-motion reproduction, quick-motion reproduction, or reversing reproduction, or of random access mode of operation, kick pulses from a kick pulse supply source 70 are supplied by way of a control circuit 71 and the terminal 64 to the gate switching circuit 61 and, at the same time, from the control circuit 71 to the driving amplifier 69. As a result, the reproducing stylus 31 is shifted from one track turn to an adjacent track turn.

In the block system which performs the above described control operation, an output error signal of the aforementioned driving amplifier 69 which has passed through a switch 75, is supplied to an integration circuit (a low-pass filter) 72, wherein the signal is integrated.

The output of the integration circuit 72 is supplied to a dead zone setting circuit 73. The dead zone setting circuit 73 has a dead zone with respect to signals of levels within a specific level range. The output of the dead zone setting circuit 73 is amplified by a motor driving amplifier 74 and then applied to the motor 19 thereby to control its rotational speed.

Accordingly, upon normal reproduction, the reproducing stylus 31 always perform the scanning in a state in which normal tracking is achieved over each track.

The essential parts of the system of the present invention will now be described, from a state before normal reproduction is started. Upon starting a normal reproduction, the disc 11 is rotated, and the carriage 15 is displaced so that the reproducing stylus 31 reaches a position corresponding to the desired reproduction starting position. Hereupon, a play button of a play operating part 40 is not pushed, and, the electronic switch 75 is in a state in which the switch is connected at the side of a contact point p which is grounded. Furthermore, the motor 19 is driven by a feed voltage supplied to the motor driving amplifier 74 from a terminal 76, and the signal pickup device 14 moves on the disc 11 in the radial direction of the disc, together with the carriage 15.

Figure 4:
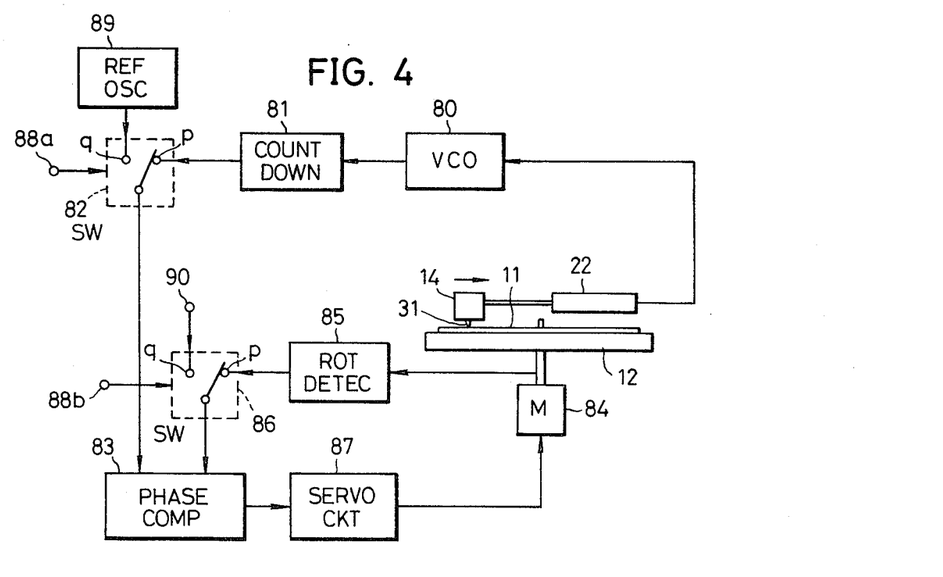
FIG. 4 is a systematic block diagram showing a first embodiment of a rotation control system according to the present invention.

Accompanied by the movement of the signal pickup device 14, a voltage corresponding to the position of the reproducing stylus 31 on the disc 11, is obtained from the variable resistor 22 shown in FIG. 4. The voltage thus obtained is supplied to a voltage-controlled oscillator (VCO) 80. The VCO 80 produces as output, a signal having a frequency respective of the voltage supplied thereto. The output signal of the VCO 80 is subjected to a frequency count-down at a count-down circuit 81, and then supplied to a phase comparator 83 through a switch 82 connected at the side of a contact point p.

On the other hand, accompanied by the rotation of the disc 11 and the turntable 12 due to the rotation of a motor 84, the number of this rotation is detected by a rotation detector 85. The output of the rotation detector 85 is supplied to the phase comparator 83 through a switch 86 connected at the side of a contact point p, and subjected to phase-comparison with the phase of the signal supplied from the count-down circuit 81. The output difference signal of the phase comparator 83 is supplied to a servo circuit 87, and the rotation of the motor 84 is controlled by the output of the servo circuit 87.

Accordingly, the motor 84 is synchronously rotated by the oscillating output of the VCO 80, and controlled of its number of rotations according to the position of the reproducing stylus 31 of the signal pickup device 14 on the disc 11. The linearity, temperature characteristic, and stability of the VCO 80 are excellent, and therefore, the error in the oscillation frequency of the VCO 80 is within ±2% as compared to the actual value respective of the position of the reproducing stylus 31. Hence, the error in the number of rotations of the disc 11, is also within ±2% as compared to the number of rotations upon recording. Furthermore, when the reproducing stylus 31 reproduces information from the disc 11, the signal pickup device 14 correctly performs the tracking by use of the block system shown in FIG. 3, only in a case where the error in the number of rotations of the disc 11 is within ±5% as compared to the normal number of rotations. Therefore, according to the system of the present invention, the error in the number of rotations of the disc 11 with respect to the position of the reproducing stylus 31 is always within ±2% before starting of the reproduction, and thus, no matter where the reproduction by the reproducing stylus 31 is started on the disc 11, correct tracking is instantly achieved.

When a play button of a play operating part 40 shown in FIG. 3 is pushed at a point where the signal pickup device 14 has moved to a predetermined position, a stylus lowering command signal is supplied to the signal pickup device 14, and the reproducing stylus 31 is accordingly lowered onto the disc 11. Hence, the reproducing stylus 31 relatively scans the surface of the disc 11 to start the reproduction of the recorded signal. Furthermore, a play signal is simultaneously supplied as output from the play operating part 40. The above play signal thus supplied from the play operating part 40 is delayed by 0.2 seconds, for example, at a delay circuit 41, and then applied to the electronic switch 75, and switches over the connection of the electronic switch 75 to the side of a contact point p. Thus, beyond this point, the reproducing stylus 31 of the signal pickup device 14 is tracking-controlled according to the reproduced reference signal.

Moreover, the output signal of the delay circuit 41 is further delayed by another 0.2 seconds at a delay circuit 42, and then applied to the switches 82 and 86 through the terminal 43 and terminals 88a and 88b shown in FIG. 4. By this signal thus applied from the delay circuit 42, the connections of the switches 82 and 86 are switched over to the sides of the contact points q. Accordingly, an output oscillating signal of a reference oscillator 89 is supplied to the phase comarator 83 through the switch 82. Furthermore, by the supplying of an output reproduced video signal of the demodulator 52 shown in FIG. 3 to a synchronized signal separation circuit 77, the separated horizontal synchronized signal is supplied to the phase comparator 83 through a terminal 78, a terminal 90 of FIG. 4, and the switch 86. Therefore, beyond this point, the rotation of the motor 84 is controlled by phase comparison difference output between the outputs of the reference oscillator 89 and the separated horizontal synchronized signal. Thus, the rotation of the disc 11 is controlled so that frequency of the reproduced synchronizing signal becomes a constant frequency, that is, the rotation of the disc 11 is controlled so that the relative linear velocity between the reproducing stylus 31 and the disc 11 becomes constant, and normal reproduction is accordingly performed by the CLV system.

When reproduction is to be performed from a desired position on the disc 11, by moving the signal pickup device 14 to the desired position in a fast-forward motion, maintaining the initial contact between the reproducing stylus 31 and the disc 11, the system can be constructed so that a play operating part 44 is provided, and a play button of the play operating part 44 is pushed to perform the above described operation.

A numerical example of the above described CLV system will now be given. When recording and/or reproduction of 60 minutes is to be performed using a disc having a diameter of 9 inches as the disc 11, for example, the diameter of the outermost periphery of the track is 217.2 mili-meters, the diameter of the innermost periphery of the track is 85 mili-meters, the number of rotations is 607 r.p.m. at the innermost periphery of the track, and the number of rotations at the outermost periphery of the track is 1632 mili-meters. Accordingly, the relative scanning linear velocity between the disc and the reproducing stylus throughout the whole region of the recording surface is 7.26 meters per second. A rotary encoder which produces 105 pulses per rotation as output, is used as the rotation detector 85. A pulse having a frequency of 1062 Hz is produced as output from the rotation detector 85 when the reproducing stylus is at the outermost peripheral position of the disc, and on the other hand, when the reproducing stylus is at the innermost peripheral position of the disc, the rotation detector 85 produces a pulse having a frequency of 2856 Hz. The VCO 80 produces as output, a signal having a frequency of 106.2 kHz when the reproducing stylus is at the outermost peripheral position of the disc, according to the voltage supplied from the variable resistor 22. However, when the reproducing stylus is at the innermost peripheral position of the disc, the VCO 80 produces a signal having a frequency of 285.6 kHz as output, according to the voltage supplied from the variable resistor 22. The output signal frequency of the VCO 80, is frequency divided into 1/100 the original frequency, at the count-down circuit 81.

Figure 5:
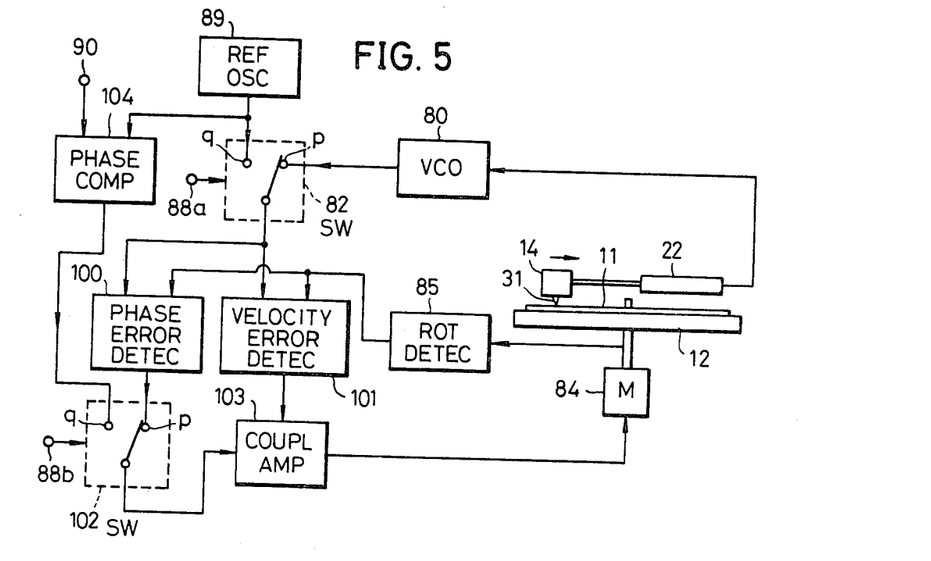
FIG. 5 is a systematic block diagram showing a second embodiment of a rotation control system according to the present invention.

A second embodiment of a system according to the present invention will now be described in conjunction with FIG. 5. In FIG. 5, those parts which are the same as those corresponding parts in FIG. 4 are designated by the like reference numerals, and their description will be omitted.

Before starting of the reproduction, accompanied by the forwarding of the signal pickup device 14 in the radial direction of the disc 11, a frequency signal which is produced by the VCO 80 according to the voltage supplied from the variable resistor 22 in a similar manner as that produced in the above embodiment, is supplied to a phase error detector 100 and a velocity error detector 101 through the switch 82 connected at the side of the contact point p. The detected output signal of the rotation detector 85 according to the rotation of the motor 84, is also supplied to both the phase error detector 100 and the velocity error detector 101.

Figure 6:
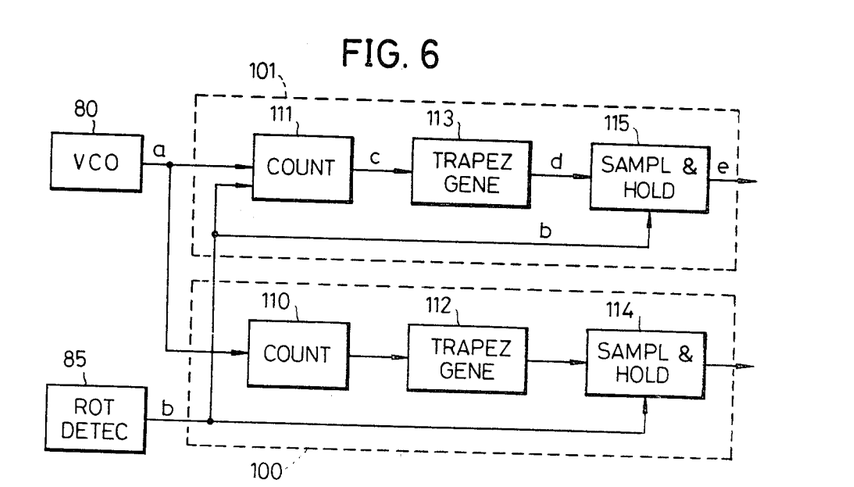
FIG. 6 is a concrete systematic diagram showing a part of the systematic block diagram of FIG. 5.
Figure 7:
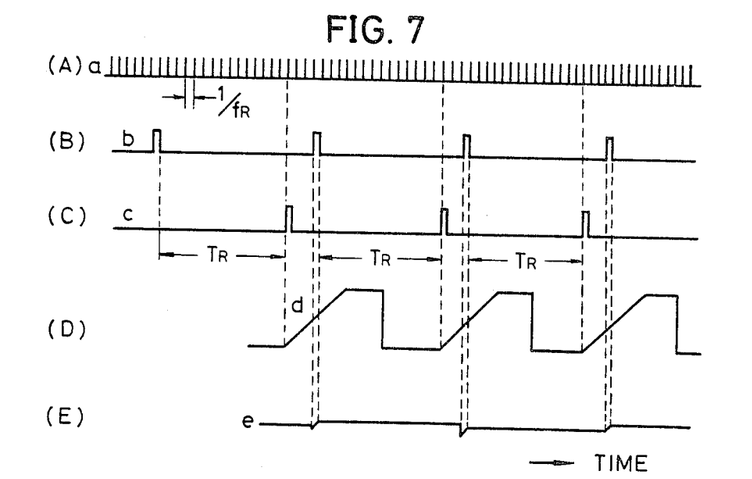
FIGS. 7(A) through 7(E) are graphs, respectively showing signal waveform at each part of the concrete block diagram of FIG. 6.

As shown in FIG. 6, the phase error detector 100 and the velocity error detector 101 respectively comprise counters 110 and 111, trapezoidal wave generating circuits 112 and 113, and sample-and-hold circuits 114 and 115. A signal a supplied from the VCO 80 having sufficiently high frequency as shown in FIG. 7(A), is supplied to the counters 110 and 111. On the other hand, a rotation detecting signal b supplied from the rotation detector 85, having a waveform shown in FIG. 7(B), is also supplied to the counters 110 and 111. The counter 111 is reset by the rotation detecting signal b, and starts counting the signal a of the VCO 80. The counted value is used for determining the pulse width which delays the input signal by a certain time, and is pre-established so that a desired delay quantity $T_R$ can be obtained. When the frequency of the signal a is $f_R$, the counted value N can be shown in terms of the frequency $f_R$ and the delay quantity $T_R$, where N is selected to be an integer. Accordingly, as shown in FIG. 7(C), the output signal of the counter 111 becomes a rotation detecting signal c which is delayed by a desired delay quantity $T_R$. The above signal c is supplied to the trapezoidal wave generating circuit 113, and a trapezoidal wave d having a predetermined slope as shown in FIG. 7(D) which is formed at the trapezoidal wave generating circuit 113, is supplied to the sample-and-hold circuit 115. The slope portion of the trapezoidal wave d is sampled and held at the sample-and-hold circuit 115 by the rotation detecting signal b, and a velocity error signal e shown in FIG. 7(E) is obtained.

When the number of rotations is to be set at a slow rotation value, the oscillating frequency of the VCO 80 is set at a low frequency. In this case, the delay quantity $T_R$ becomes large, and corresponds to when the center frequency of the velocity error detecting signal is lowered.

On the other hand, in the phase error detector 100, the counter 110 is supplied with the signal a from the VCO 80. The signal thus supplied to the counter 110, is converted into a trapezoidal wave at the trapezoidal wave generating circuit 112, and then supplied to the sample-and-hold circuit 114 wherein the signal is sampled and held by the signal b supplied from the rotation detector 85. Hence, a signal respective of the phase error between the signals a and b supplied from the sample-and-hold circuit 114, is obtained.

The velocity error signal e obtained from the velocity error detector 101, which is respective of the position of the reproducing stylus 31 on the disc 11 in the radial direction of the disc, is supplied to a coupling amplifier 103. The signal thus supplied to the coupling amplifier 103, is added with the phase error signal obtained from the phase error detector 100 through a switch 102 connected at the side of the contact point p, and amplified, at the coupling amplifier 103. The output signal of the coupling amplifier 103 is supplied to the motor 84 to control the rotation of the motor 84.

According to the present embodiment, since the frequency of the reference signal a varies according to the position of the reproducing stylus 31 on the disc 11 in the radial direction of the disc, the center frequency of the velocity error signal e automatically varies in response to the above variance, and the signal becomes a velocity error signal respective of the number of rotations of the motor 84. Furthermore, a phase error signal respective of the above number of rotations is obtained from the phase error detector 100.

Upon starting of a normal reproduction, the connection of the switches 82 and 102 are changed over to the sides of the contact points q, by the switchover signals supplied from the terminals 88a and 88b. The signal from the reference oscillator 89 obtained through the switch 82, and the detected signal from the rotation detector 85, are supplied to the phase error detector 100 and the velocity error detector 101. Because the switch 102 is switched over and connected at the side of the contact point q, only the output signal of the velocity error detector 101 is supplied to the coupling amplifier 103.

On the other hand, the phases of the reference signal supplied from the reference oscillator 89 and the synchronized signal supplied from the terminal 90, are subjected to phase comparison at the phase comparator 104. Moreover, the output phase difference signal of the phase comparator 104 is supplied to the coupling amplifier 103 through the switch 102, and then added with the output signal of the velocity error detector 101, and finally amplified.

Figure 8:
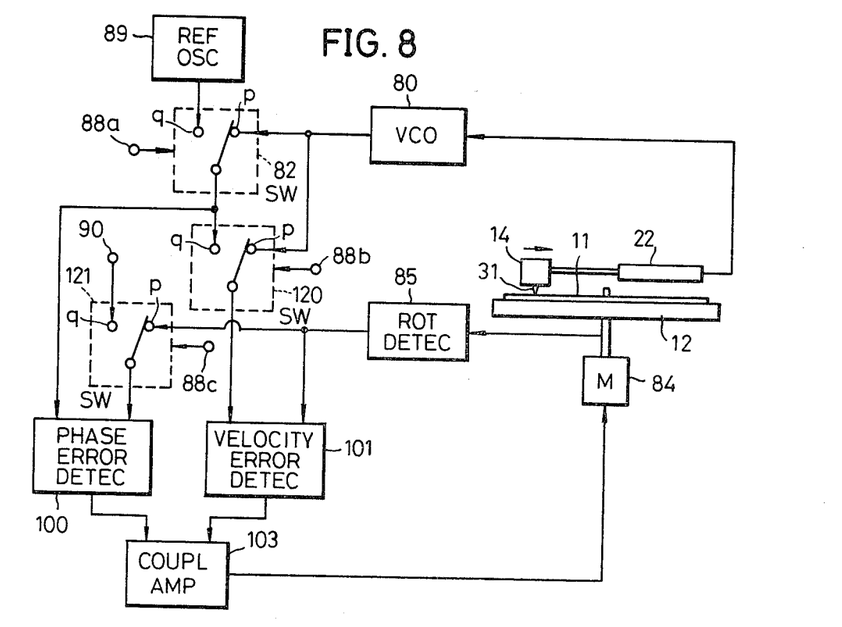
FIG. 8 is a systematic block diagram showing a third embodiment of a rotation control system according to the present invention.

A third embodiment of a rotational control system according to the present invention will now be described in conjunction with FIG. 8. In FIG. 8, those parts which are the same as those corresponding parts in FIG. 5 are designated by the like reference numerals, and their description will be omitted. In a state before the starting of a normal reproduction, the switch 82 and switches 120 and 121 are connected at the sides of the contact point p. The oscillating output of the VCO 80 is respectively supplied to the velocity error detector 101 through the switch 120, and to the phase error detector 100 through the switch 82. The detected output of the rotation detector 85 is directly supplied to the velocity error detector 101, and also supplied to the phase error detector 100 through the switch 121.

Upon starting of a normal reproduction, the connection of the switches 82, 120, and 121 are changed over to the sides of the contact points q, by the signals supplied from the terminals 88a, 88b, and 88c. Accordingly, the detected output of the rotation detector 85, and the signal of the reference oscillator 89 obtained through the switches 82 and 120, are supplied to the velocity error detector 101. On the other hand, the synchronized signal of the terminal 90 obtained through the switch 121, and the signal of the reference oscillator 89 obtained through the switch 82, are supplied to the phase error detector 100.

Further, this invention is not limited to these embodiments but various variations and modifications may be made without departing from the scope of the invention.

What is claimed is:

1. A rotation control system in an apparatus using a reproducing stylus for reproducing information signals from a rotary recording medium, said rotary recording medium having information signals recorded thereon so that the relative velocity between reproducing means and said rotary recording medium is maintained constant, said rotation control system comprising:

a motor for rotating said rotary recording medium;

positional signal obtaining means for obtaining a positional signal corresponding to the position of said reproducing stylus on said rotary recording medium;

variable frequency oscillating means responsive to said positional signal for producing a signal having a frequency which varies in accordance with said positional signal;

rotation detecting means for detecting the rotation of said motor;

comparing means for comparing the output signal of said variable frequency oscillating means with the output signal of said rotation detecting means, to produce an output difference signal;

controlling means for controlling the rotation of said motor in response to said difference signal;

a reference oscillator means for generating a reference frequency signal;

synchronized signal separating and supplying means for separating a synchronized signal from a signal reproduced from said rotary recording medium by use of said reproducing stylus;

a first switching means for selectively supplying the output of said variable frequency oscillating means and the output of said reference oscillator means to said comparing means; and a second switching means for selectively supplying the output of said rotation detecting means and the synchronized signal of said synchronized signal separating and supplying means coupled said switching means to said comparing means, said first and second switching means respectively supplying the outputs of said variable frequency oscillating means and said rotation detecting means to said comparing means before a starting of a normal reproduction, and said first and second switching means being switched over to respectively supply the output of said reference oscillator means and the synchronized signal of said synchronized signal separating and supplying means to said comparing means upon normal reproduction.

2. A rotation control system in an apparatus using a reproducing stylus for reproducing information signals from a rotary recording medium, said rotary recording medium having information signals recorded thereon so that the relative velocity between reproducing means and said rotary recording medium is maintained constant, said rotation control system comprising:

a motor for rotating said rotary recording medium;

positional signal obtaining means for obtaining a positional signal corresponding to the position of said reproducing stylus on said rotary recording medium;

variable frequency oscillating means responsive to said positional signal for producing a signal having a frequency which varies in accordance with said positional signal;

rotation detecting means for detecting the rotation of said motor;

comparing means for comparing the output signal of said variable frequency oscillating means with the output signal of said rotation detecting means, to produce an output difference signal, said comparing means comprising a first comparing means for detecting the phase error and a second comparing means for detecting the velocity error;

controlling means for controlling the rotation of said motor in response to said difference signal;

a reference oscillator means for generating a reference frequency;

synchronized signal separating and supplying means for separating a synchronized signal from a signal reproduced from said rotary recording medium by use of said reproducing stylus;

a phase comparator means for performing a phase comparison between the output signal supplied from said reference oscillator means and said synchronized signal;

a first switching means for selectively supplying the outputs of said variable frequency oscillating means and said reference oscillator means to said first and second comparing means;

a second switching means for selectively passing the outputs of said first comparing means and said phase comparator; and means for adding the output of said second comparing means and the output which has passed through said second switching means, and for supplying the signal thus obtained to said motor to control the rotation of said motor, said first and second switching means respectively passing the outputs of said variable frequency oscillating means and said first comparing means before a starting of a normal reproduction, and said first and second switching means being switched over to respectively pass the outputs of said reference oscillator means and said phase comparator upon normal reproduction.

3. A rotation control system as claimed in claim 2 in which said first and second comparing means respectively comprise a counter supplied with the outputs of said variable frequency oscillating means and said rotation detecting means, for providing an output signal which is delayed by a predetermined quantity with respect to the output of said rotation detecting means, a trapezoidal wave forming circuit supplied with the output of said counter, for forming a trapezoidal wave, and a sample-and-hold circuit for sampling and holding the trapezoidal wave supplied from said trapezoidal wave forming circuit by use of the output pulse of said rotation detecting means.

4. A rotation control system in an apparatus using a reproducing stylus for reproducing information signals from a rotary recording medium, said rotary recording medium having information signals recorded thereon so that the relative velocity between reproducing means and said rotary recording medium is maintained constant, said rotation control system comprising:

a motor for rotating said rotary recording medium;

positional signal obtaining means for obtaining a positional signal corresponding to the position of said reproducing stylus on said rotary recording medium;

variable frequency oscillating means responsive to positional signal for producing a signal having a frequency which varies in accordance with said positional signal;

rotation detecting means for detecting the rotation of said motor;

comparing means for comparing the output signal of said variable frequency oscillating means with the output signal of said rotation detecting means, to produce an output difference signal, said comparing means comprising a first comparing means for detecting the phase error and a second comparing means for detecting the velocity error;

controlling means for controlling the rotation of said motor in response to said difference signal;

a reference oscillator means for generating a reference frequency;

synchronized signal separating and supplying means for separating a synchronized signal from a signal reproduced from said rotary recording medium by use of said reproducing stylus;

a first switching means for selectively passing the outputs of said variable frequency oscillating means and said reference oscillator means;

a second switching means for selectively supplying the output of said variable frequency oscillating means and the output of said reference oscillator means obtained through said first switching means to said second comparing means; and a third switching means for selectively supplying the synchronized signal of said synchronized signal separating and supplying means and the detected output of said rotation detecting means to said first comparing means, said rotation detecting means supplying its detected output to said second comparing means, said first switching means supplying a signal which has passed through therein to said first comparing means, said first and second switching means respectively supplying the output of said variable frequency oscillating means to said first and second comparing means, and said third switching means supplying the output of said rotation detecting means to said first comparing means before a starting of a normal reproduction, said first and second switching means respectively being switched over to supply the output of said reference oscillator means to said first and second comparing means, and said third switching means being switched over to supply the synchronized signal separating and supplying means to said first comparing means, upon normal reproduction.

* * * * *